United States Patent

[11] 3,588,244

[72] Inventors Karl M. Murgas
Lincolnwood, Ill.;
Burton Greenberg; Otto A. Clark, Chicago, Ill.
[21] Appl. No. 761,648
[22] Filed Sept. 23, 1968
[45] Patented June 28, 1971
[73] Assignee ICP, Inc.,
Skokie, Ill.
Continuation-in-part of application Ser. No. 745,841, July 18, 1968, now abandoned.

[54] BOOK COPIER ATTACHMENT FOR A PHOTOCOPY MACHINE
15 Claims, 11 Drawing Figs.
[52] U.S. Cl........................................... 355/8,
355/25, 355/82
[51] Int. Cl............................................... G03b 27/62
[50] Field of Search............................... 355/25, 82, 8

[56] References Cited
UNITED STATES PATENTS
2,161,352  6/1939  Hopkins............. 355/25

*Primary Examiner*—Samuel S. Matthews
*Assistant Examiner*—Richard A. Wintercorn
*Attorney*—Robert L. Slater, Jr.

ABSTRACT: A book copier attachment for a document reproduction apparatus including a frame, a carrier means for movement within the frame when the attachment is positioned on the apparatus. A bearing means secures the carrier in the frame and includes means to enable the carrier to be lifted away from the frame when the attachment is releasably locked on the apparatus,—so that the carrier may be transported across a scanning window for reproducing the original document positioned thereon.

PATENTED JUN 28 1971
3,588,244
SHEET 1 OF 3
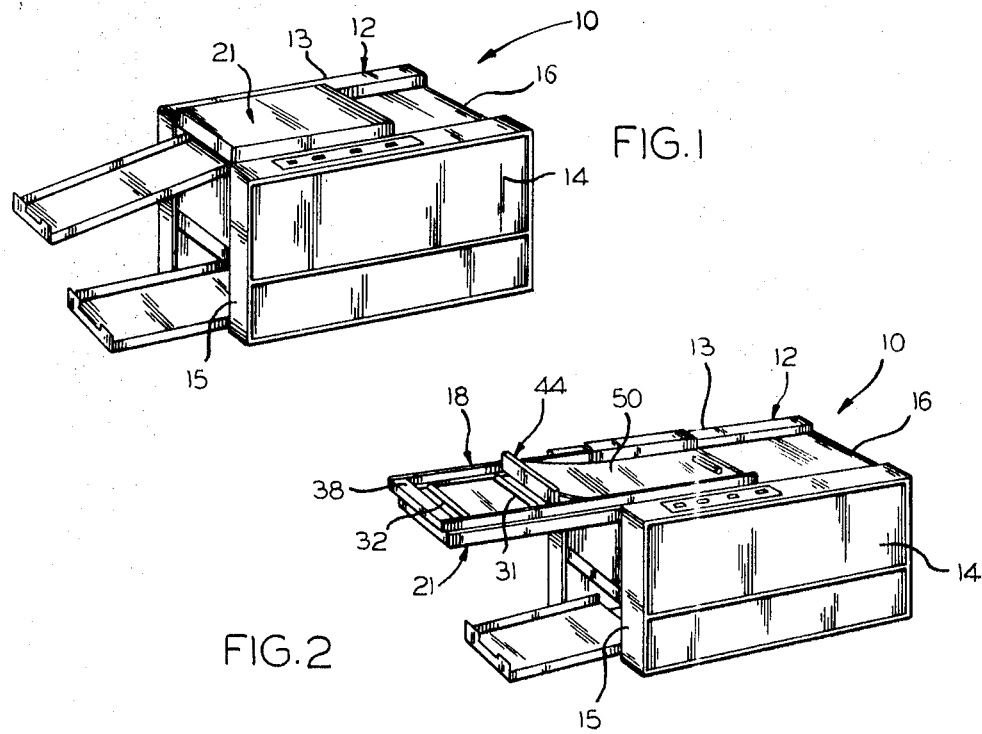
FIG.1
FIG.2
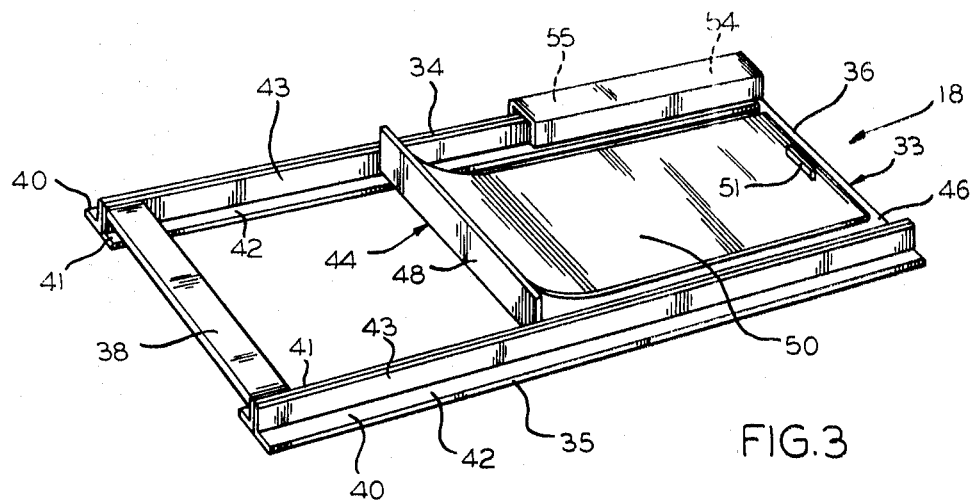
FIG.3
INVENTORS
KARL M. MURGAS
BURTON GREENBERG
BY OTTO A. CLARK
Robert L. Slater, Jr.
ATTORNEY

INVENTORS
KARL M. MURGAS
BURTON GREENBERG
BY OTTO A. CLARK

Robert L. Slater, Jr.
ATTORNEY

INVENTORS
KARL M. MURGAS
BURTON GREENBERG
OTTO A. CLARK
BY
Robert L. Slater, Jr.
ATTORNEY 3,588,244

BOOK COPIER ATTACHMENT FOR A PHOTOCOPY MACHINE

BACKGROUND OF THE INVENTION

The subject invention is a continuation-in-part of the patent application entitled "A Combination Sheet and Book Copy Machine," filed on July 18, 1968 and having Ser. No. 745,841.

The present invention relates generally to a photocopy device for reproducing an original document sheet or book, and more particularly, relates to a single photocopy machine capable of being converted from a rapid cycle sheet copier to a book copier or from a book copier to a rapid cycle sheet copier. Still more particularly, the invention relates to a book copier attachment for use only when the photocopy machine is used as a book copier.

Electrostatic photocopy devices are commonly constructed to pass a specially coated and electrostatically charged sheet of copy paper through the focal plane of an optical conversion system. The original document to be copied is positioned before the objective camera lens. The image of the document is transferred through the optical camera system and onto the sensitized surface of the copy paper. The exposed or sensitized surface of the copy paper is then passed through a fluid suspension of ink particles suitably charged to react with the electrostatically charged image borne upon the copy paper surface.

Previous to the subject invention photocopy machines having a movable original document system and a movable copy paper system were used primarily for reproducing documents in a sheet form. When books or other articles of substantial thickness were to be reproduced, the machines having a movable camera system were generally used and the original document and copy paper were maintained stationary.

Recently a single photocopy machine having a movable original document system and a movable copy paper system has been used for reproducing sheets and books. In these machines, the original document whether sheet or book, is placed on a movable carriage. The carriage is transported across the objective lens of the camera and after the document is scanned, the carriage returns to its original position.

Since each reproduction of the sheet or book required the use of the movable carriage, the operation of the machine was slow and time consuming. The subject invention overcomes this problem by providing a photocopy machine which only requires a carrier for reproducing a book or other articles of substantial thickness. For reproduction of an original document sheet, the book copier is easily and simply converted to a rapid cycle sheet copier which does not require a carrier for the original document. Since the office type photocopy machine is generally used far more for reproducing document sheets of either letter or legal size, the faster rapid cycle copying provided by the subject invention would be used for the major portion of machine operation, and the same machine would still be available for book copying.

SUMMARY OF THE INVENTION

The present invention provides a photocopy machine for reproducing an original document sheet or book. The machine comprises an original document transport system having a rapid cycle sheet copying position and a book copying position. A book copier attachment is provided for releaseably locking onto the machine when the original document system is in the book copying position. The attachment includes a carrier on which a book or article to be copied is placed. The original document means transports the carrier across a scanning window for reproducing the book.

The book copier attachment further comprises bearing means which cooperate with the rollers of the original document transport system when the attachment is locked onto the machine, to provide smooth and positive movement of the carrier during the reproduction operation. The bearing means additionally functions to secure the carrier to the frame of the book copier attachment when the attachment is off the machine.

Accordingly, a primary object of our invention is to provide a single photocopy machine for reproducing an original document sheet or book.

Another primary object is to provide a book copier attachment for use when the photocopy machine is used as a book copier.

Another object is to provide a photocopy machine having an original document transport system which is convertible from a rapid cycle sheet transport system to a book transport system, or from the rapid cycle sheet transport system to the book transport system.

Another object of the invention is to provide a carrier plate for an original document which is movable within the frame of a book copier attachment when the attachment is secured on the photocopy machine, and releasably locked to the frame when the attachment is removed from the photocopy machine.

Still another object of the invention is to provide a carrier for a book which moves smoothly and positively during the reproduction operation.

These and other objects and advantages of the invention will become apparent from the illustrations in the accompanying drawings and the following specification and claims.

BRIEF DESCRIPTION OF THE DRAWINGS

Referring to the drawings in which the same characters of reference are employed to indicate a corresponding or similar part throughout the several figures of the drawing.

FIG. 1 is a perspective view of a photocopy machine when used as a rapid cycle sheet copier;

FIG. 2 is a perspective view of the photocopy machine when used as a book copier;

FIG. 3 is a perspective view of a book copier attachment for use when the photocopy machine is used as a book copier;

DESCRIPTION OF THE PREFERRED EMBODIMENT

Figure 4:
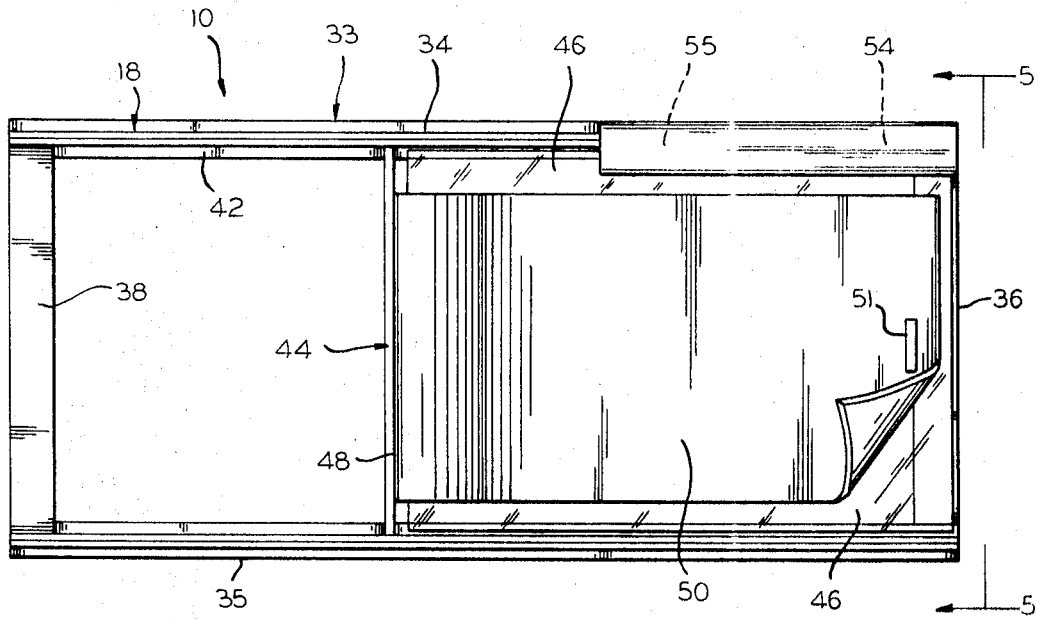
FIG. 4 is a top view of the photocopy machine with the book copier attachment secured thereon.

Referring now to FIGS. 1 and 2 of the drawings, the reference numeral 10 indicates generally a combination sheet and book photocopy machine. The photocopy machine 10 comprises a substantially rectangular main frame 12 having a pair of opposed sidewalls 13 and 14, a front side 15 and a rear side 16.

The combination sheet and book photocopy machine 10 may be used as a rapid cycle sheet copier as shown in FIG. 1 or as a book copier as shown in FIG. 2. A book copier attachment indicated generally by the reference numeral 18 (see FIGS. 2 and 3) is manually secured on frame 12 when the machine is used for book copying.

Figure 8:
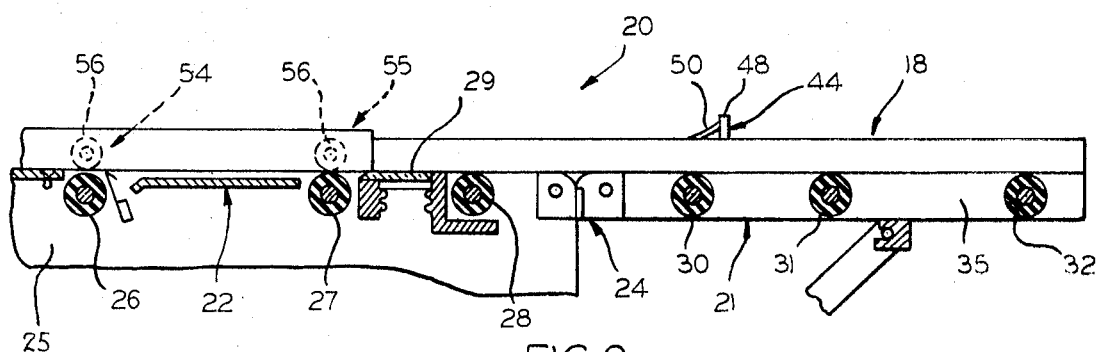
FIG. 8 is a sectional fragmentary side view of the original document transport system in a book copier position with the book copier attachment secured thereon.
Figure 9:
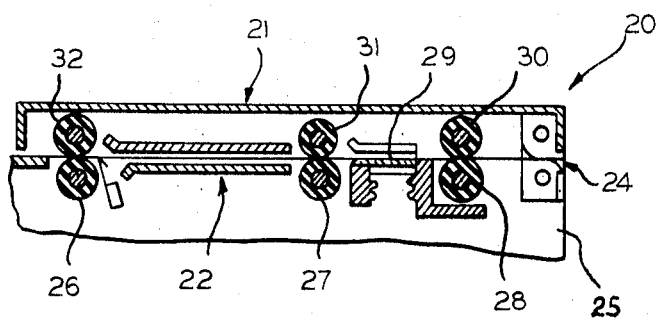
FIG. 9 is a sectional fragmentary view of the original document transport system when in a rapid cycle sheet copier position.

The photocopy machine 10 comprises an original document transport system indicated generally by the reference numeral 20 (FIGS. 8 and 9). The original document transport system 20 includes a movable section 21 and a stationary section 22. Movable section 21 has an operative position shown in FIG. 9 when machine 10 is used as a rapid cycle sheet copier, and a nonoperative position shown in FIG. 8 when the machine 10 is used as a book copier.

Pivot means indicated generally by reference numeral 24 enables movable section 21 to be conveniently rotated from the operative position to the nonoperative position and vice versa. Although various constructions for pivot means 24 may be used, a suitable pivot means is disclosed in our prior said patent application Ser. No. 745,841.

Stationary section 22 (FIGS. 8 and 9) comprises transversely extending, spaced apart drive rollers 26, 27 and 28 which are rotatably journaled to opposed inner sidewalls 25 positioned between the outer sidewalls 13, 14 of main frame 12. Rollers 26, 27 and 28 are linked to a motor driven chain (not shown). A scanning window 29 is disposed between rollers 27 and 28.

Movable section 21 comprises transversely extending and spaced apart idler rollers 30, 31 and 32 which are rotatably journaled to sidewall members 35. When the photocopy machine 10 is used for rapid cycle sheet copying, idler rollers 30, 31 and 32 of movable section 21 are in juxtaposition spaced slightly above drive rollers 26, 27 and 28 respectively (FIG. 9).

For book copying, the movable section 21 is in the outward nonoperative position (FIG. 8). The book copier attachment 18 is manually secured on machine 10 when movable section 21 is in the nonoperative position. For rapid cycle sheet copying, the attachment 18 is removed from machine 10 and the movable section 21 is pivoted to its operative position (FIG. 9) above stationary section 22.

Turning now specifically to FIGS. 2 through 6, the book copier attachment 18 will be described in detail. The attachment 18 is a substantially rectangular frame 33 having a pair of identical elongated spaced apart and opposed side supports 34, 35 (FIGS. 3 and 4). Rods 36 and 38 rigidly connect the opposite ends of side supports 34, 35 together. Rod 38 is positioned at a higher level than rod 36.

The side supports 34, 35 of attachment 18 include a right angled outer bracket 40 and a right angled inner bracket 41. Brackets 40, 41 comprise a base leg 42 and a side leg 43 bent or formed upward therefrom (FIG. 3). Side legs 43 of brackets 40, 41 are rigidly secured together back-to-back. Base legs 42 of the inner brackets 41 extend inward toward each other.

A carrier means indicated generally by reference numeral 44 is positioned inside frame 33 of the book copier attachment means 18. Carrier means 44 includes a transparent rectangular plate 46, preferably of glass, rigidly secured at one of its transverse ends to a support wall 48. The width of plate 40 is greater than the distance of the transverse space between the outer edges of the base legs 42 of inner brackets 41 of side supports 34, 35. Carrier means 44 operatively moves longitudinally within frame 33 between rods 36, 38.

A rectangular supporting mat 50 is rigidly secured at one of its transverse ends to the upper end of support wall 48. Mat 50 normally slopes downward from support wall 48 and covers substantially the entire upper surface area of plate 46. Mat 50 is constructed from rubber or a suitable plastic material which is flexible and of sufficient weight to support and prevent undesirable movement of a book or article inserted between mat 50 and plate 46. A grip 51 is secured at the free end of mat 50 for lifting the mat away from the plate.

An outer bearing means and an inner bearing means indicated respectively by reference numerals 54, 55 provide an upper support for the carrier means 44 as it moves within the frame of the attachment 18. Bearing means 54, 55 further function to lock the carrier in place after the attachment 18 is removed from the photocopy machine 10.

Figure 5:
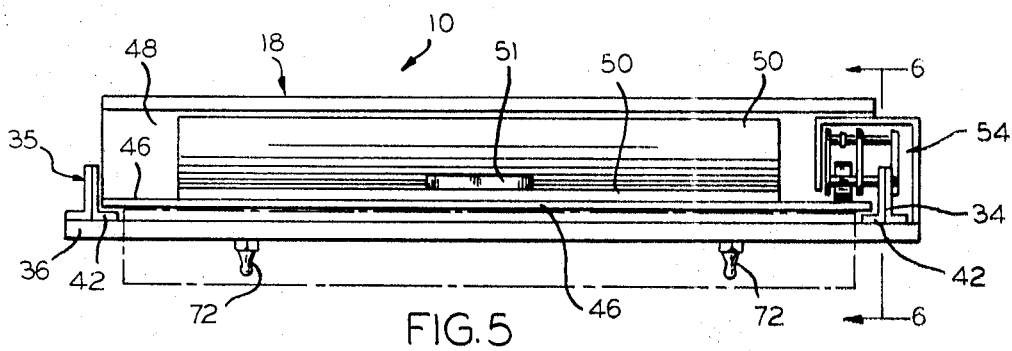
FIG. 5 is a front view taken on the plane of the line 5-5 in FIG. 4, viewed in the direction indicated, and showing portions in dotted outline in order to view the securing fingers of the book copier attachment.
Figure 6:
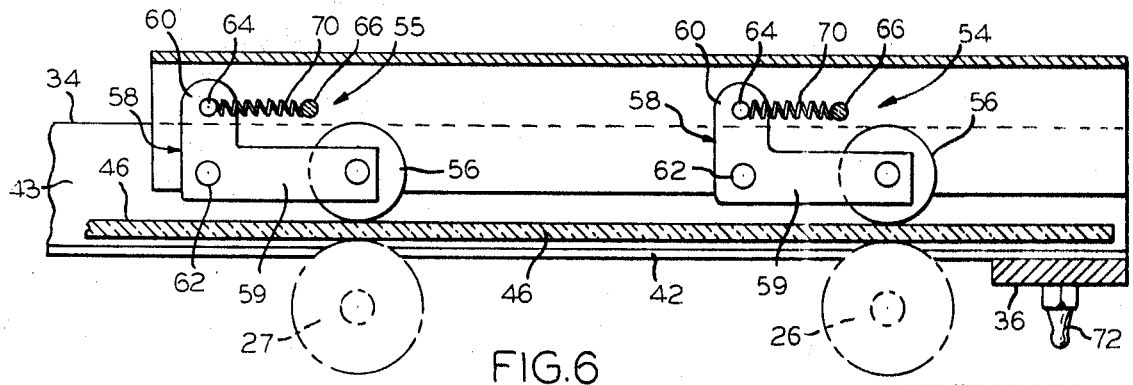
FIG. 6 is a side sectional fragmentary view, taken on the plane of the line 6-6 in FIG. 5, viewed in the direction indicated, and showing the position of the bearing means with respect to the drive rollers of the original document transport system.
Figure 7:
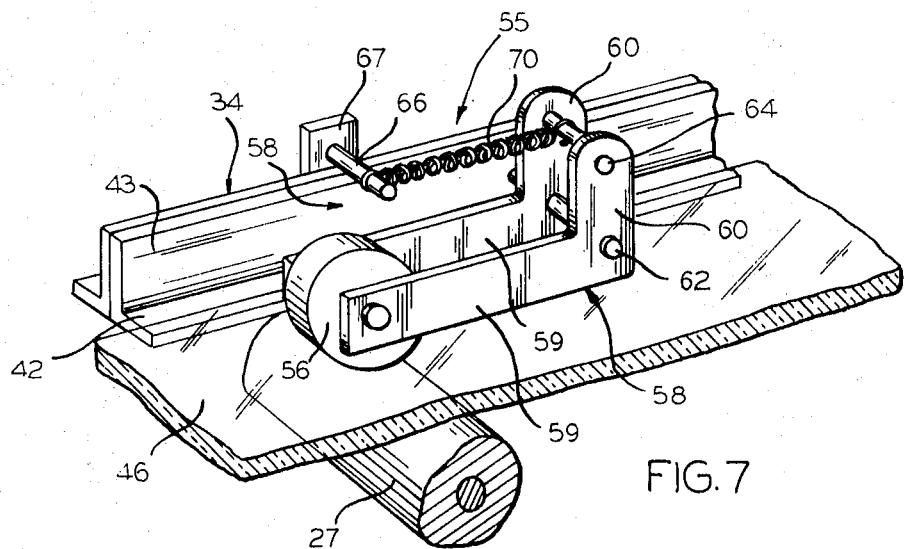
FIG. 7 is a fragmented perspective enlarged view of the book copier attachment and a roller of the original document transport system.

Referring now particularly to FIGS. 5, 6 and 7, bearing means 54, 55 comprise a roller 56 rotatably journaled between a pair of spaced apart substantially L-shaped brackets 58. Each bracket 58 includes a long portion 59 and a short portion 60. The roller 56 is disposed between the outer ends of the long portions 59 of the brackets 58.

Brackets 58 are pivotally secured between the outer ends of their long and short portions 59, 60 on a lower bar 62 which is fastened to side support 34. An upper bar 64 is secured between the upper ends of the short portions 60 of the brackets 58. A bar stub 66 (FIGS. 6 and 7) extends inward from a mounting plate 67 (FIG. 7) secured to side support 34. Stub 66 is positioned between short portion 60 and the outer ends of long portion 59 of brackets 58 at a vertical level above roller 56.

An elongated coiled spring 70 is secured on upper bar 64 and stub 66 and spans the distance therebetween. Spring 70 provides a force causing brackets 58 to pivot in the inward or clockwise direction as viewed in FIG. 6. If the roller 56 is moved upwardly, the brackets 58 pivot on the lower bar 62 against the resilient force of spring 70. Thus, the bearing means 54, 55 pivot outwardly in this manner when attachment 18 is positioned on the machine 10 as the drive rollers 26, 27 and 28 of the transport system 20 force plate 46 upward. When the attachment 18 is removed from the machine, bearing means 54, 55 pivot inward in response to the resilient force of spring 70.

A pair of spaced locking fingers 72 extend downward from the lower surface of rod 36 (FIGS. 5 and 6) to press-fit into accommodating apertures (not shown) disposed on the top of the photocopy machine 10, and thereby releaseably lock the book copier attachment 18 to the photocopy machine 10. The frame 12 of the photocopy machine and the movable section 21 provide support for the attachment 18 as may be seen specifically in FIG. 2.

The rollers 56 of bearing means 54, 55 are substantially in vertical alignment respectively above rollers 26, 27 of the stationary section 22 of the original document transport system 20 when the attachment 18 is secured on the photocopy machine 10. Prior to the commencement of the reproduction operation, plate 46 is sandwiched between rollers 26, 27 of the original document system and rollers 56 respectively of bearing means 54 and 55 as shown in FIG. 6. During the reproduction operation, at least roller 56 of the inner bearing means 55 is bearing against plate 46.

Figures 10, 11:
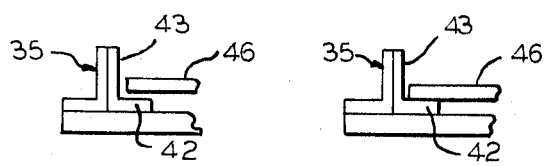
FIG. 10 is a front fragmentary view of the book copier attachment to show the carrier plate spaced above the bottom of the frame when the attachment is positioned on the machine.
FIG. 11 is a view similar to FIG. 10 but showing the carrier plate in contact with the bottom of the frame when the book copier attachment is off the machine.

Drive rollers 26, 27 of the original document transport system 20 extend slightly above the vertical level of base legs 42 of the inner brackets 41 of side supports 34, 35 and into the space therebetween when the attachment 18 is properly positioned on the machine 10. Thus, the drive rollers 26, 27 lift the plate 46 upward away from the base legs 42 as may be seen in FIGS. 6 and 10. The force from the drive rollers cause the bearing means to pivot outward in opposition to the resilient force of spring 70 while the roller 56 remains in contact with the upper surface of plate 46. Therefore, by having the plate 46 in a raised position and between at least one roller of the bearing means and the drive rollers of the original document system, the carrier 44 is transported smoothly and positively across the scanning window.

As the book copier attachment 18 is raised away from the machine for removal, the bearing means 54, 55 gradually forces the plate 46 inwardly. When the attachment is fully removed, the plate 46 is securely clamped to the base legs 42 of the inner bracket 41 of the side supports 34, 35 by the bearing means.

The carrier 44 is moved automatically by the drive rollers 26, 27 and 28 from an input end for the original document transport system 20 of the machine 10, across the scanning window 29 and back to the input end. Alternatively, the carrier 44 may be moved automatically by the drive rollers 26, 27 and 28 from the input end across the scanning window and manually returned to the input end.

The carrier 44 may include means (not shown) for triggering switches to control carrier movement and some system operations as the carrier moves between the input and output ends.

The foregoing description of a preferred embodiment of our invention is intended merely as illustrative of our invention the scope and limits of which are set forth in the following claims.

We claim:

1. A book copier attachment for a reproduction apparatus having an original document transport system, said attachment comprising:
   a frame;
   a carrier means for movement within said frame; and
   locking means associated with said frame for cooperating with said reproduction apparatus to releasably lock the book copier attachment to said reproduction apparatus.

2. The book copier attachment defined in claim 1, wherein said carrier means comprises:
   a plate for movement within the frame; and
   bearing means for releasably securing the plate to the frame, said bearing means including means for cooperating with said reproduction apparatus to cause the plate to be spaced from the frame when the attachment is secured to the reproduction apparatus.

3. The book copier attachment defined in claim 1 wherein:
   said frame includes a pair of spaced apart side supports, each support including inward extending ledges;
   said carrier includes a plate for movement within the frame; and
   bearing means including means for securing the plate to said ledges when the attachment is not on the apparatus and for cooperating with the apparatus to cause the plate to be lifted away from said ledges when the attachment is secured on the apparatus.

4. A book copier attachment for a reproduction apparatus having an original document transport system, said attachment comprising:
   a frame;
   a plate, said plate moving within the frame when the attachment is locked to the apparatus;
   a roller contacting said plate; and resilient means associated with the roller to force said roller against the plate to secure the plate to the frame when the attachment is not on said apparatus.

5. The book copier attachment as defined in claim 4, wherein said bearing means further comprises:
   pivot means associated with said roller and said resilient means to enable said roller to move outwardly in opposition to the inward urging force of the resilient means when the book copier attachment is locked onto the apparatus and thereby releasing the plate from the frame.

6. The book copier attachment defined in claim 4, wherein the roller of said bearing means is positioned at a point in the frame to be substantially in vertical alignment with a roller of said original document transport system of said apparatus when the attachment is locked onto the apparatus.

7. The book copier attachment as defined in claim 5 wherein said pivot means comprises a pair of spaced apart and opposed substantially L-shaped members, each of said members having a first portion and a second portion extending upward therefrom, said roller of the bearing means being rotatably journaled to the outer end of the first portion, said members being pivotal around a point between the outer ends of said portions, said resilient means being associated with the outer ends of the second portion to cooperate with the pivot means and urge the roller of the bearing means inward against said plate.

8. The book copier attachment defined in claim 5 further includes at least one locking finger extending outward from said frame to press-fit on said apparatus for locking said attachment thereon.

9. In a reproduction apparatus including an original document transport means for moving an original document through a pathway from an input end to an output end, a scanning window disposed in the pathway, said original document being reproduced onto copy paper as it moves across said scanning window, said original document transport means comprising:
   a movable section having a sheet copier position and a book copier position;
   a stationary section, said movable section being adjacent to and above the stationary section when in the sheet copying position whereby said movable section and said stationary section cooperate for transporting a sheet document across the scanning window; and
   a book copier attachment means attachable to said apparatus when the movable section is in the book copier position, said attachment means comprising a frame and a carrier means for movement within said frame and across said scanning window.

10. The apparatus of claim 9 wherein said carrier means comprises a plate and said attachment means further comprises bearing means to bear against said plate during said movement.

11. The apparatus of claim 10 wherein said bearing means of the book copier attachment comprises:
   a roller; and
   resilient means associated with the roller to normally force said roller against the plate.

12. The apparatus of claim 11 wherein said bearing means further comprises pivot means associated with said roller and said resilient means, said roller being associated with the pivot means whereby it is pivoted outwardly in opposition to the force of the resilient means when the attachment means is locked onto the apparatus and is pivoted inwardly to lock the plate to the frame of the book copier attachment when the attachment is removed from the apparatus.

13. The apparatus of claim 11 wherein the roller of said bearing means is positioned at a point in the frame to be substantially in vertical alignment with a roller of said original document transport system of said apparatus when the attachment is locked on the apparatus.

14. The apparatus of claim 13 wherein said frame of the attachment comprises spaced apart and opposed sidewalls having ledges which extend inward from the bottom of the sidewalls in an opposed spaced relationship, said plate being secured to said ledges when the attachment is off the machine, the rollers of the original document transport system extend above said ledges in the space therebetween when the attachment is secured on the machine and thereby causing the plate to be lifted away from said ledges.

15. In a reproduction apparatus including an original document transport means having a plurality of spaced apart roller means for moving an original document through a pathway from an input end to an output end, a scanning window disposed in the pathway said original document being reproduced onto the copy paper as it moves across said scanning window, a removable book copier attachment means comprising:
   a frame;
   a plate for positioning said original document thereon, said plate being spaced from the frame and contacting said roller means of the apparatus when operatively associated with the apparatus for movement of at least a portion of said plate across said scanning window, said plate being secured to the frame when removed from the apparatus.